Figure 1:
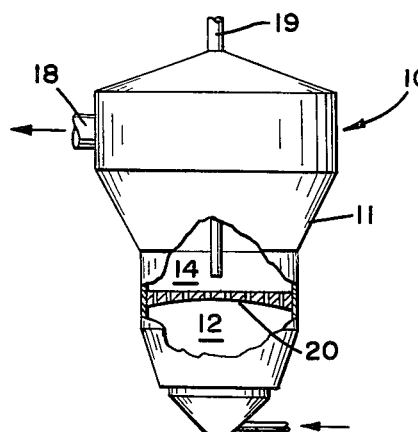

United States Patent
Steever et al.

[11] 4,073,064
[45] Feb. 14, 1978

[54] REFRACTORY CONSTRUCTION DOME FOR FLUIDIZED BED REACTOR

[75] Inventors: Andrew Beaumont Steever, Old Greenwich; Richard Ernest Svencer, Norwalk, both of Conn.

[73] Assignee: Dorr-Oliver Incorporated, Stamford, Conn.

[21] Appl. No.: 675,858

[22] Filed: Apr. 12, 1976

[51] Int. Cl.² .............................................. F23M 5/02
[52] U.S. Cl. ................................. 34/57 A; 110/99 B; 432/58
[58] Field of Search .................. 110/8 F, 28 J, 99 B; 122/4 D; 34/57 A; 432/58, 3

[56] References Cited
U.S. PATENT DOCUMENTS

| 2,836,902 | 6/1958 | North ................................. 34/57 A |
| 2,876,079 | 3/1959 | Upchurch et al. ................... 34/57 A |
| 3,672,648 | 6/1972 | Price .................................. 34/57 A |
| 3,863,359 | 2/1975 | Grega .................................. 432/58 |
| 3,980,439 | 9/1976 | Mayer .................................. 432/58 |

Primary Examiner—John J. Camby
Assistant Examiner—Larry I. Schwartz
Attorney, Agent, or Firm—Harold M. Snyder; Burtsell J. Kearns

[57] ABSTRACT

A refractory constriction dome for a fluidized bed reactor is constructed to resist the upward thrust of pressure in the windbox as well as the weight of the fluidized bed. A reverse arch of refractory brick or tiles, forming the upper surface of the dome, is the structural feature which functions to resist upward thrust.

7 Claims, 5 Drawing Figures

U.S. Patent     Feb. 14, 1978     4,073,064

REFRACTORY CONSTRUCTION DOME FOR FLUIDIZED BED REACTOR

This invention is directed to an improved refractory constriction dome for a fluidized bed reactor.

Fluidized bed reactors consist of a furnace vessel having a reaction chamber and a windbox therein separated by a constriction dome or plate. A bed of particulate solids rests on the constriction dome in the reaction chamber and, in operation, air is forced into the windbox and through the constriction plate by a blower to suspend the particulate solids in the upwardly moving stream of air. In the reaction chamber of such a fluidized bed reactor the particles are in essentially constant motion, the mixture of solids and gas behaving very much like a liquid with the solids said to be in a fluidized condition. Intense and violent mixing between the solids and gas occurs within the fluidized bed and results in completely uniform conditions as to temperature, composition and particle size distribution throughout the bed. In this environment drying, heat treatment and many chemical reactions are carried out in a convenient and expeditious manner.

Fluidized bed reactors are operated with either cold or hot windboxes; i.e., the fluidizing air may be used at ambient temperature or it may be preheated. Constriction plates for cold windbox reactors may be made from steel, but when hot windboxes are employed the constriction dome is made of a refractory material and a refractory lining for the windbox proper is provided. Of course, the reaction chamber may also have a refractory lining. While the term "refractory" is sometimes used to describe metals which retain useful properties at elevated temperatures, in this description the term is employed only to describe materials of the ceramic type, such as pre-fired fire clay.

Refractory constriction domes are usually circular in plan view and are fabricated from a plurality of concentric courses of refractory bricks or tiles. Since the refractory constriction domes are self-supporting, an arched or dome-like construction is necessary. At the level at which the dome is supported, the refractory lining of the reactor vessel is provided with a band of refractory skewback shapes having inner faces constituting oblique upwardly directed support surfaces. Concentric inner courses of refractory tiles are provided within the band of skewbacks in mutually supportive relationship. The shapes of the tiles in each concentric ring are a matter of conventional practice as shown in "Modern Refractory Practice", Fourth Edition, published by Harbison Walkers Refractories Company (1961), see pages 507 to 525.

As fluidized bed reactors have increased in size in recent years, refractory constriction domes have been fabricated to span ever larger reactor diameters. As the domes get larger, the thickness of the tile near the outer periphery becomes greater, often now exceeding three feet. Since it is not feasible to manufacture tile of such great size, rings of filler tile are laid on the refractory tile forming the supportive structure of the dome to provide a suitable surface on which the fluidized bed rests.

At times, in the operation of fluidized bed reactors, it is necessary to provide high pressure drops across the constriction dome. Pressure drops of this kind tend to raise the dome, and filler tile are sometimes roughly moved and lifted out of position in the constriction dome by such forces. The resultant loosening, breakage and removal of tile ultimately threatens the integrity of the constriction dome. The repair or replacement of the constriction dome is a time-consuming and expensive procedure resulting in lost operating time. Clearly, there is a problem here which calls for a constriction dome resistant to the destructive forces discussed above.

Accordingly, it is an object of this invention to provide an improved construction for a refractory constriction dome.

It is another object of the invention to provide a refractory constriction dome which is resistant to the forces developed by the pressure drop across the dome.

It is a further object of this invention to provide a constriction dome capable of resisting forces exerted in an upward direction.

Figure 2:
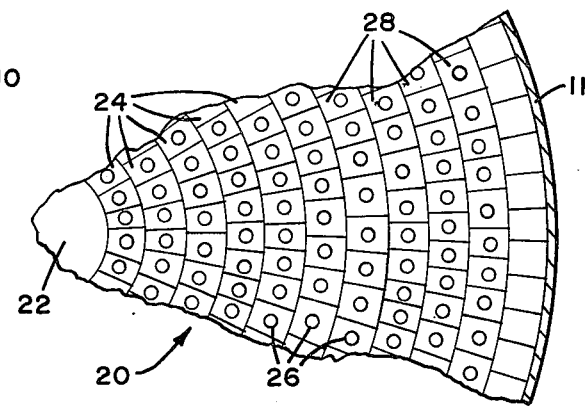
Figure 3:
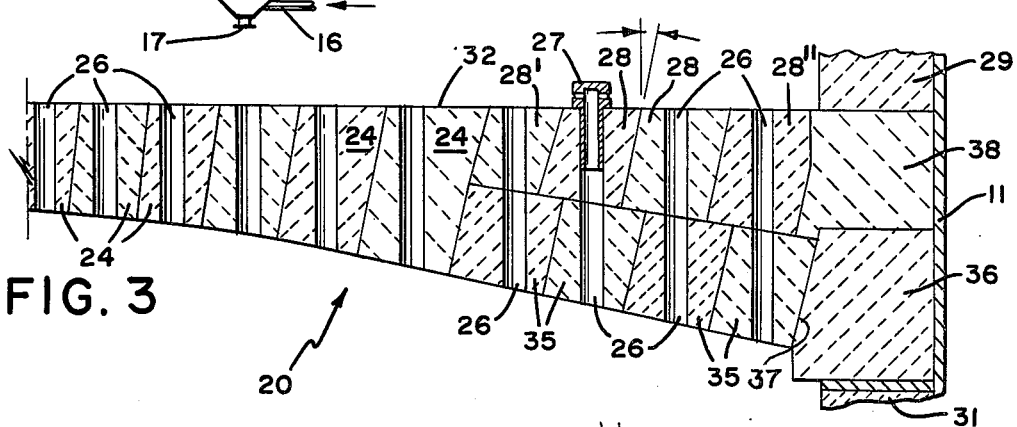
Figure 4:
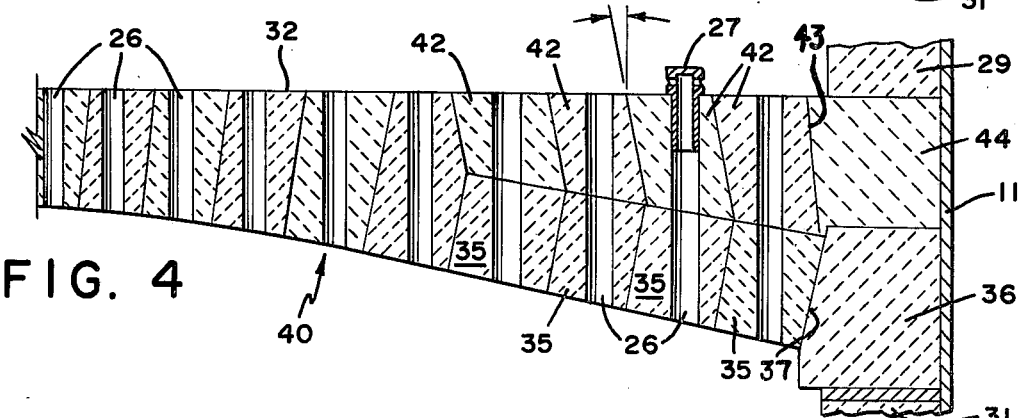
Figure 5:
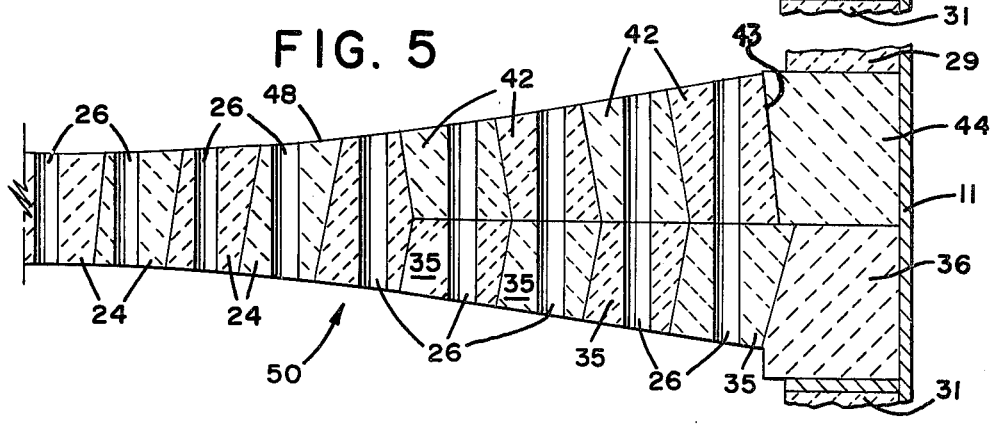

Other objects and advantages of the present invention will become apparent from the following description taken in conjunction with the accompanying drawings in which:

FIG. 1 is a view in elevation, partially in section, of a fluidized bed reactor having a refractory constriction dome, FIG. 2 is a plan view of a segment of a typical prior art refractory constriction dome, FIG. 3 is a partial sectional view of the prior art refractory constriction dome, FIG. 4 is a view similar to that of FIG. 3 of the constriction dome of the present invention, and FIG. 5 is a view similar to that of FIG. 3 of a second embodiment of the constriction dome of the present invention.

Generally speaking, the refractory constriction dome of the present invention, which includes refractory brickwork forming a conventional dome resistant to downwardly directed forces, is also characterized by a layer of refractory tile constituting at least part of the top surface of the dome which is constructed to form a reverse arch dome to resist forces exerted in an upward direction.

More specifically, in a fluidized bed reactor having refractory sidewalls, a refractory constriction dome is provided dividing the reactor vessel into a reaction chamber and a windbox. There are a pair of refractory skewback rings in the reactor sidewalls arranged one above the other. The oblique surface of the lower skewback ring opens upwardly, while the oblique surface of the upper skewback ring opens downwardly. The lower skewback ring supports the constriction dome in conventional fashion, but the upper skewback ring is in supporting contact with a layer of refractory brick in the constriction dome which is arranged in the form of a reverse arch dome. This reverse arch dome will resist forces exerted in an upward direction.

Referring to the drawing, there is illustrated a fluidized bed reactor 10 having a metal shell 11. Within the shell 11, a hot windbox 12 and a reaction chamber 14 are separated by a refractory constriction dome 20 having a plurality of holes 26 therethrough for insert tuyeres 27. Feed conduit 19 communicates with reaction chamber 14 and air inlet 16 has access to windbox 12. Exhaust gas conduit 18 communicates with the freeboard region of the reaction chamber 14 and cleanout port 17 is provided for the windbox 12. A conduit (not shown) for removing solid product from the reaction chamber is also provided in most cases.

The prior art constriction domes 20 shown in FIGS. 2 and 3 consist of a plurality of concentric courses of refractory brick or tile 24, 28 which span the interior of the reactor 10 from the shell 11 to a central refractory shape 22. The refractory bricks 24, 28 in these concentric rings have provided therein the holes 26 for the tuyeres 27. As can be seen in FIG. 3, the constriction dome 20 is supported by a ring of skewbacks 36 which have an inner oblique surface 37 contacting the outer periphery of the constriction dome tiles or bricks 35. The constriction dome bricks 24, 35 are arranged to form an architectural dome which is capable of supporting not only its own weight, but the weight of the fluidized bed resting thereon. The refractory bricks 28 of this prior art constriction dome are filler bricks, merely providing a level surface for supporting the fluidized bed. The tuyere holes 26 of the bricks 28, 35 are aligned and a tuyere 27 (only one shown) is cemented in place in each tuyere hole 26.

In FIGS. 4 and 5, illustrating the improvement of the present invention in constriction domes 40 and 50, it will be noted that the skewbacks 36 and the bricks 35, 24 forming the architectural dome structure of the constriction domes, are essentially unchanged from the prior art structure. However, the skewback shape 44 has an inner, oblique surface 43 which opens downwardly and the refractory bricks of the top surface of the constriction dome are laid to essentially repeat this angle for succeeding concentric courses of bricks so that a reverse arch dome is formed. This reverse arch dome will resist upward thrust on the constriction dome 40, 50, transmitting such thrust to the reactor walls through the ring of skewbacks 44. While the top surface 32 of the constriction dome may be flat as shown in FIG. 4, if desired, a dished or concave top surface 48 may be provided as shown in FIG. 5.

It should be noted that the filler tile are generally smaller and lighter than other tile in the dome and are therefore most vulnerable to lifting. When the tiles 28 (FIG. 3) rise only slightly as a result of high pressure drop across the tuyeres, they are then located in a somewhat larger circle and, hence, lose constraint from neighboring tile in the same ring. Various ideas have been advanced to restrain these tiles such as, for example, making the top of filler tile 28' narrower than the bottom in the radial direction and nipping in the top of the outside face of the outermost tile 28''. These expedients are only partly successful since they do not apply to intermediate filler tile, which in the past have had outwardly sloping circumferential faces as shown.

Heavy, deep fluidized beds appear likely to become more common in the future. For proper fluidization in such beds, high pressure drops through the constriction plate tuyeres, say 1 psi or more, are required in normal operation. Scaling of the tuyeres during operation may also be the cause of an increased pressure drop. In the prior art constriction dome, replacing filler tile becomes difficult when it involves the outer ring, sometimes requiring tearing out a part of the refractory side wall.

In the constriction dome of the present invention, with the tiles of the reverse dome having inwardly sloping circumferential faces, if a tile is subjected to a force which would tend to make it rise, the tile is actually being urged into a smaller circle, thus meeting the increased restraint from neighboring tile in the same ring. With this construction, the tile will resist an upward thrust due to tuyere pressure drop or gas intrusion under the tile, many times the combined weight of tuyere and tile.

If tile 28' (FIG. 3) has a height of twelve inches and a density of 145 lbs./ft.$^3$, it would theoretically lift up if the pressure drop through it and its tuyere should exceed 28 inches water column. This is just over 1 psi, a pressure at which it might be desirable to operate for fluidization reasons. The improved construction of FIGS. 4 and 5 would withstand many times this pressure drop and thereby put the less resistant structure closer to the center of the dome than the ring in which tile 28' is located. The resistance of the center of the dome can be increased by using relatively large tile at least up to the limits of manufacture of large tile. If still further increase in the resistance of the center of the dome is desired, the reverse dome construction can be extended inwardly from the tile 28' ring even to the center, if necessary.

While the compartment beneath the constriction dome has been described as a windbox, it will be understood that this compartment may also be a reaction compartment, the off-gases of which pass through the constriction dome to serve as the fluidizing gases for the upper compartment.

Although the present invention has been described in conjunction with preferred embodiments, it is to be understood that modifications and variations may be resored to without departing from the spirit and scope of the invention, as those skilled in the art will readily understand. Such modifications and variations are considered to be within the purview and scope of the invention and appended claims.

We claim:

1. A fluidized bed reactor having a refractory-lined sidewall, a refractory constriction dome comprising a plurality of concentric courses of refractory brick, means supporting said refractory constriction dome in a position dividing the interior of said reactor into a reaction chamber and a windbox, a layer of refractory brick in said constriction dome arranged in the form of a reverse arch dome to resist upwardly directed forces imposed on said constriction dome, a ring of skewback refractory brick imbedded in said reactor sidewall, said skewback refractory brick engaging the outer periphery of said reverse arch dome to support said dome against said upwardly directed forces, said ring of skewback refractory brick having an inner oblique face, opening downwardly and contacting a mating face provided on the outer periphery of said reverse arch dome.

2. The constriction dome of claim 1 wherein said layer of brick forming the reverse arch dome constitutes the top surface of said constriction dome.

3. A fluidized bed reactor having refractory-lined sidewalls, a refractory self-supporting constriction dome dividing said reactor into a reaction chamber and a windbox, said constriction dome being composed of a plurality of concentric courses of refractory brick for supporting a bed of fluidized particulate solids, a first ring of skewback brick embedded in the reactor sidewalls having an inner oblique face, opening upwardly, at the outer periphery of said dome for contacting and supporting said dome and any downward load imposed thereon, a second ring of skewback brick located above said first ring of skewback brick having an inner oblique face, opening downwardly, for contacting and supporting a layer of refractory brick of said constriction dome arranged in the form of a reverse arch dome to resist upwardly directed forces imposed on said constriction dome.

4. The fluidized bed reactor of claim 3 wherein said layer of refractory brick comprises at least a portion of the top surface of said constriction dome.

5. The fluidized bed reactor of claim 4 wherein said first skewback brick ring is in contact with said second skewback brick ring.

6. The fluidized bed reactor of claim 4 wherein said second skewback brick ring is upwardly spaced from said first skewback ring.

7. The fluidized bed reactor of claim 6 wherein any volume gap between the respective refractory brick domes contacting said spaced skewback rings is occupied by refractory filler brick.

* * * * *